Figure 1:
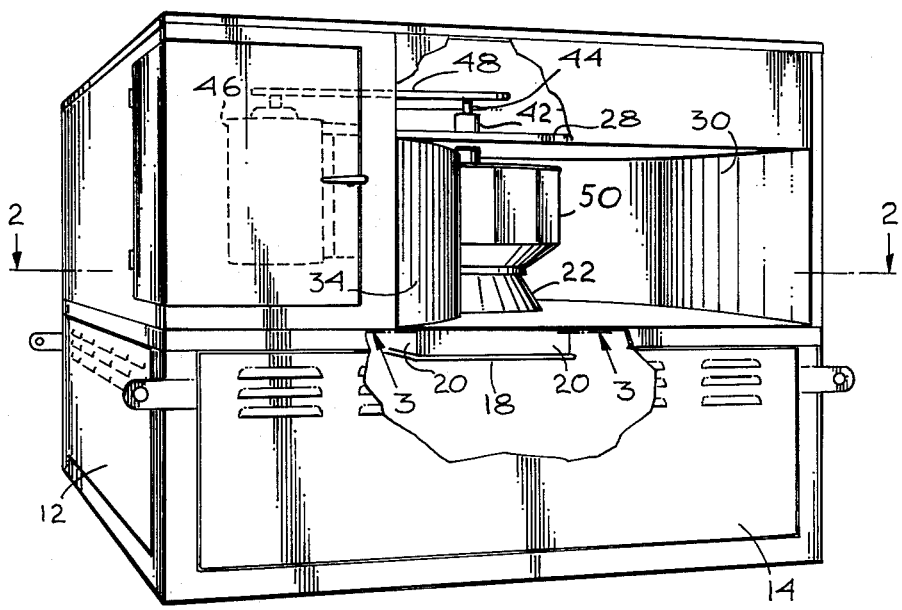
Figure 1:
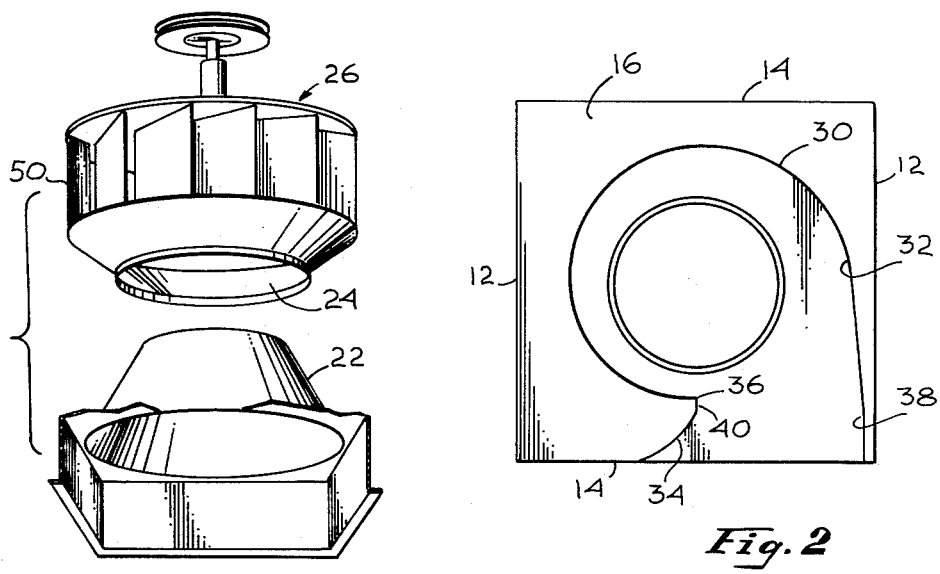

Jan. 18, 1966  M. D. SHAFER  3,229,898
POWER VENTILATOR
Filed May 11, 1964

*Fig. 3*  *Fig. 2*

INVENTOR.
MARVIN D. SHAFER
BY Samuel Lindenberg
ATTORNEY

United States Patent Office 3,229,898
Patented Jan. 18, 1966

3,229,898
POWER VENTILATOR
Marvin D. Shafer, 2925 Knox Ave., Los Angeles 37, Calif.
Filed May 11, 1964, Ser. No. 366,311
1 Claim. (Cl. 230—127)

The invention relates to power ventilating equipment and more particularly to improvements having particular application in industrial and commercial installations.

Ventilating installations and particularly those adapted for use in restaurants, catering establishments, or other businesses engaged in the preparation of food, present rather difficult problems from the standpoint of cleanliness and safety. For example, in commercial kitchens, where food preparation is a substantially continuous process, large amounts of grease and other fatty oily substances are continuously present. During the process of food preparation, odors, smoke and minute globules of greasy, fatty and oily substances are continuously formed and discharged into the atmosphere immediately above the locale of food preparation. It is the function of power ventilating equipment, in combination with appropriate hooding structure, to remove these undesirable substances from the kitchen area. In the usual installation, the ventilating equipment is arranged to effect discharge of these undesired products to atmosphere.

Ventilating equipment heretofore used, has generally been reasonably effective in removing odor, smoke, etc. from the kitchen area. The globules of grease, fatty or oily material which, as noted, are created in the course of the cooking process remain in a generally liquid state and cannot generally be considered gaseous. They are, however, of such small particle size that they can be moved with movements of air within the surrounding environment. These small globules of fatty and oily substances adhere to any surface which they may come in contact and present a health and cleanliness hazard. Most desirably, any ventilating equipment which is used should be effective to carry and discharge as much as possible of the mentioned minute liquid globules harmlessly to the atmosphere just as it does the gaseous product of food preparation. It is also desirable that the venilating equipment be effective to convey any of the minute globules of oil and greasy substances not discharged into the atmosphere to a safe and remote location for deposit and relative ease of cleaning.

The minute globules of fat and other greasy materials created by cooking, if not adequately removed by the ventilating equipment from the cooking area, creates a fire hazard either in the region of the ventilating hood or in the power ventilator itself and fires do occur in these areas.

An object of this invention is to provide a power ventilating arrangement which is effective to completely remove from the cooking locale all incidental by-products of the cooking process, whether in a gaseous, vapor or liquid state.

A further object of this invention is to provide a novel ventilating arrangement which is additionally effective to transport any liquid material in the cooking atmosphere, such as grease globules, to a remote location where the fire hazard is minimal for deposit and easy cleaning.

Specifically, the invention comprehends a power operated blower unit in operative juxtaposition to a hood, the latter being designed to be physically located in appropriate relationship to a cooking area or other area from which it is desired to induce air removal. Interposed between the hood and blower arrangement an open ended cowl arrangement is provided. The cowl annularly defines a passage through which the air, under the action of the blower, is induced to move. The cowl, in the preferred form of the invention, has a truncated conical form with the upper end of the cone telescopically received within a lower open aspect of the blower. The path defined by the cowl, of course, is in communication with a volume defined by the hood structure. A scroll, of novel design, defines a first chamber receiving a rotatable blower. The scroll additionally defines an exhaust chamber, the latter having one end thereof communicating with the atmosphere or other discharged port, while the other end of the exhaust chamber communicates with the first-mentioned chamber. The before-mentioned cowl is physically mounted on a plate which defines the lower aspect of the scroll and the chambers defined thereby. The blower per se is arranged to rotate about a generally vertical axis and is provided with vertically arranged blades. The intake of the blower defines a downwardly directed opening communicating with the upwardly directed opening of the cowl. Completing the structure, the scroll, defining the exhaust chamber, is provided with a throat constriction at the point of communication with the blower chamber, and that portion of the exhaust chamber remote from the constriction defines an enlarged volume.

With the brief description of the structure embodying the disclosed invention, it will be understood that certain important advantages result therefrom. Initially, the blower, by virtue of its horizontal plane rotation, imports a vortex-like motion to the withdrawing air, creating thereby, an extremely powerful air flow. The power of the flow is such that not only the gaseous and vaporized by-products of the cooking operation, but even those products which are in liquid particle form, are sucked forceably upwardly toward the center of the truncated cowl and into the blower itself. Within the blower, a high centrifugal force is applied to the air inducing annular discharge flow radially upwardly through the scroll defined blower chamber and exhaust chamber. By virtue of the mentioned constricted neck at the opening of the exhaust chamber a venturi effect results increasing the velocity of the air moving therethrough. This velocity increase creates, in the exhaust chamber, a decreased pressure which further enhances the ventilating effect.

The vortex-like flow from the moving air mass avoids erratic motion of the atmosphere carried inflammable grease particles and the like and thereby avoids accidental disposition of same on the cooking equipment thereby inhibiting accidental fire. The flow additionally minimizes disposition of the grease and fatty particles on the cooking equipment and structure thereby easing the cleaning operation thereof. Greasy and oily droplets carried by the moving air are either discharged to atmosphere or deposited within the scroll defined chambers which are readily accessible for cleaning.

The above objects and advantages of the invention as well as other features thereof will be more clearly understood in the course of the following description and from an examination of the related drawings, wherein:

FIGURE 1 is a partially fragmentary perspective view of a presently preferred embodiment of the invention, FIGURE 2 is a sectional view taken approximately along line 2—2 of FIGURE 1, and FIGURE 3 is a fragmentary composite exploded view illustrating the cowl and blower relationship.

Describing the invention in detail and directing attention to the figures, the numeral 10 generally indicates an enclosure or housing for the power ventilator. Joined end and side walls 12 and 14 encase the entire arrangement and provide support for internal structure thereof. A horizontal plate 16 is carried by the end and side walls at an approximate vertical median point as seen in an elevational view. Internally of the housing, a hood 18 is provided, said hood comprising depending plates 20, 20 joined in rectangular formation and defining a vertical passage through the plate 16.

A cowl 22 is secured to the upper side of the plate 16 and is preferably of truncated conical form. The cowl 22 is arranged centrally of the hood 18 as seen in plan view, and continues the definition of the upwardly directed passage heretofore mentioned. The upper opening defined by the cowl 22 is in predetermined communicating relationship with the downwardly directed intake opening 24 of the blower, indicated generally at 26.

A second generally horizontal plate 28 is carried by the end and side walls 12 and 14 in vertical spaced relationship with the first-mentioned plate 16. An arcuately formed vertical plate 30 joins the plates 16 and 28 to define therewith a blower chamber 32. Another plate 34, also vertically arranged, is connected, as at 36, to the plate 30 and joins the plates 16 and 28. Plate 34 is formed to diverge outwardly, as seen in plan view, to define with the mentioned plates an exhaust chamber 38. The outer aspect of the exhaust chamber is, of course, arranged for discharge to atmosphere. It will be noted that the plate 34, and its diverging formation, defines at 40, a constricted neck within the exhaust chamber in close adjacency to the point of communication with the blower chamber.

Conventional bearing structure 42 is carried by the plate 28 and journally mounts shaft 44, the latter being physically connected to a blower 26, to accommodate blower rotation on a generally vertical axis. A power source, such as the motor 46, is carried by the housing 10 and is in operative pully drive connection 48 with the blower 26. The blower 26 is, of course, provided with a plurality of peripherally arranged and angularly set blades 50, 50.

The operation of the unique power ventilating arrangement will now be considered. The motor 46 induces high velocity rotary motion of the blower 26. This blower rotation induces relatively high velocity vortex-like upward motion of the atmosphere in the area immediately below the hood 18. The flow induced in the atmosphere below the hood 18 powerfully draws all cooking by-products, whether in gaseous, vapor or liquid state, vertically upwardly and through a first constriction formed by the cowl 22. At this point, a first venturi effect is created lowering the pressure of and increasing the velocity of the moving atmosphere. As the atmosphere enters the blower through the inlet 24, a high centrifugal force is imparted thereto by the rotating blades 50. This centrifugal force has the effect of changing the atmospheric flow from a vortiginous action into a relatively smooth laminar radially outwardly moving flow. This relatively smooth laminar flow is generally arcuate by virtue of the guiding effect of the vertical plate 30 defining the blower chamber. As the atmosphere moves from the blower chamber into the area of the neck constriction 40 in the exhaust chamber 38, a secondary venturi effect is produced increasing atmosphere velocity and lowering the pressure in the exhaust chamber. In this manner, the contaminated atmosphere from the food preparing location is efficiently and effectively discharged through the exhaust chamber 38.

The vortex-like atmospheric flow in the area of the hood and cowl is extremely effective in the prevention of erratic disposition of inflammable grease and oily globules on the cooking apparatus. The relatively smooth generally arcuate laminar-type flow within the blower and exhaust chamber carries most of the greasy particles to exhaust. Nevertheless, some of the grease particles will, by virtue of the mentioned flow in these chambers, contact the plates defining said chambers and adhere thereto. It will be noted, however, that both the blower and exhaust chambers are readily accessible thus simplifying any cleaning operation required therein.

It will now be apparent from the above-described structure and operation that a highly efficient and effective power ventilating arrangement is provided. The arrangement described offers the additional feature of physical compactness enhancing appearance and providing substantial economy in manufacture.

The invention as described is by way of illustration and may be subject to certain modifications and changes without departing from the essential features thereof or the scope of the appended claim.

What is claimed is:

In a power ventilator arrangement comprising a housing having space confining walls, a horizontal support plate in said housing dividing said space into a lower substantially closed area to be vented and upper blower containing area, a depending hood from said supporting plate into said lower area defining a substantially large confined area, a converging collar communicating with said hood through an opening in said supporting plate and extending upwardly from the latter to define an intake for a blower wheel, plate means carried by said supporting plate and defining therewith a generally annular closed horizontal blower chamber substantially concentric with said collar and a diverging diffuser, said diffuser chamber having a vent port at one end through one of said walls of said housing to the surrounding atmosphere and communicating with said blower chamber at the other end, a blower wheel supported horizontally on a vertical axis in said annular chamber and substantially concentric therewith, said blower having a front conical depending shroud communicating with the small end of the upwardly extending collar, a restriction in said diffuser chamber adjacent the periphery of the blower wheel to increase the velocity of fluid flow from said annular chamber into said diffuser chamber whereby said blower wheel being operative to induce vortiginous flow from said substantially closed area to be vented the surrounding atmosphere through said vent port.

References Cited by the Examiner

UNITED STATES PATENTS

| 1,892,930 | 1/1933 | Burman | 230—127 |
|---|---|---|---|
| 2,148,254 | 2/1939 | Bergstrom | 230—128 |
| 2,233,991 | 3/1941 | Walters | 230—133 |
| 2,268,046 | 12/1941 | Marker et al. | 230—133 |
| 2,852,181 | 9/1958 | Kline et al. | 230—117 |
| 3,174,541 | 3/1965 | Brandt et al. | 230—117 |

FOREIGN PATENTS

| 733,533 | 7/1955 | Great Britain. |
|---|---|---|
| 942,535 | 11/1963 | Great Britain. |

SAMUEL LEVINE, *Primary Examiner.*

HENRY F. RADUAZO, *Examiner.*